June 5, 1951  R. J. McLEOD  2,556,142
MACHINE FOR PRODUCTION OF GEAR TEETH
Filed March 6, 1945  5 Sheets-Sheet 1

Inventor
Robert J. McLeod
by Wilkinson & Mawhinney
Attorneys

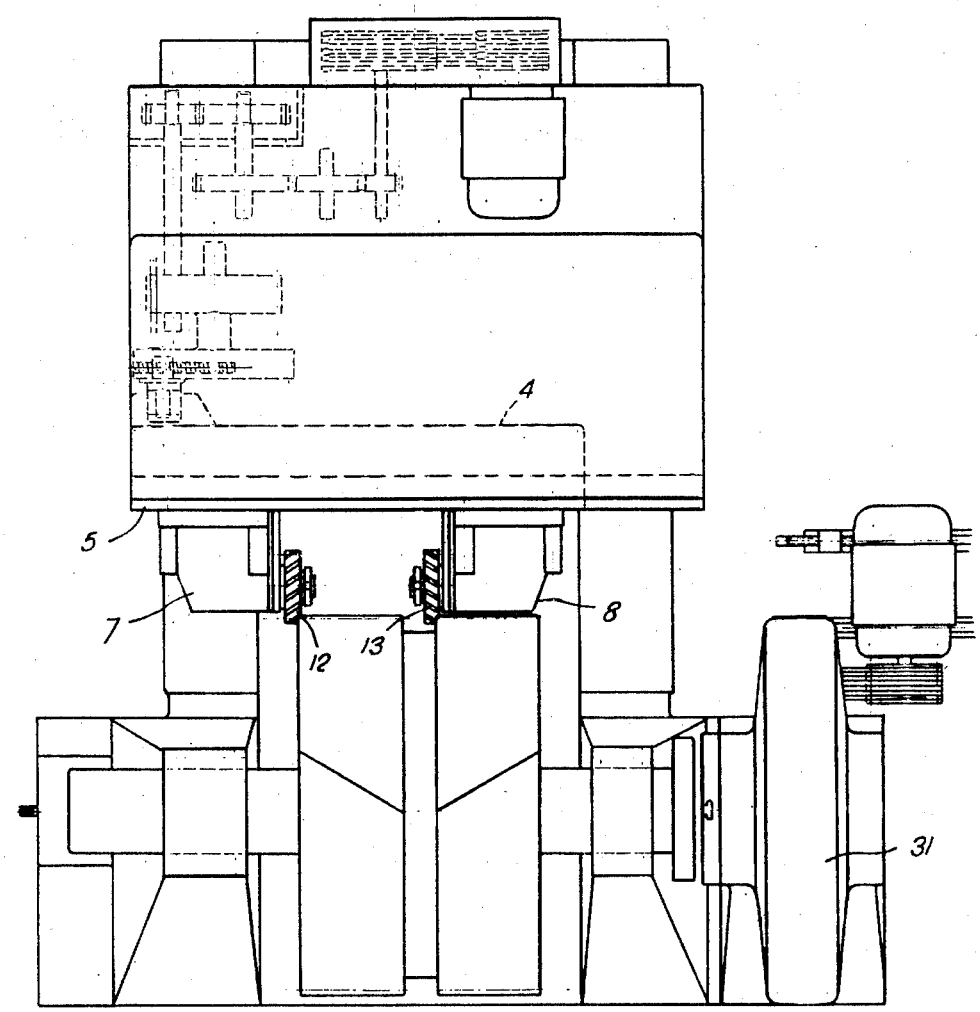

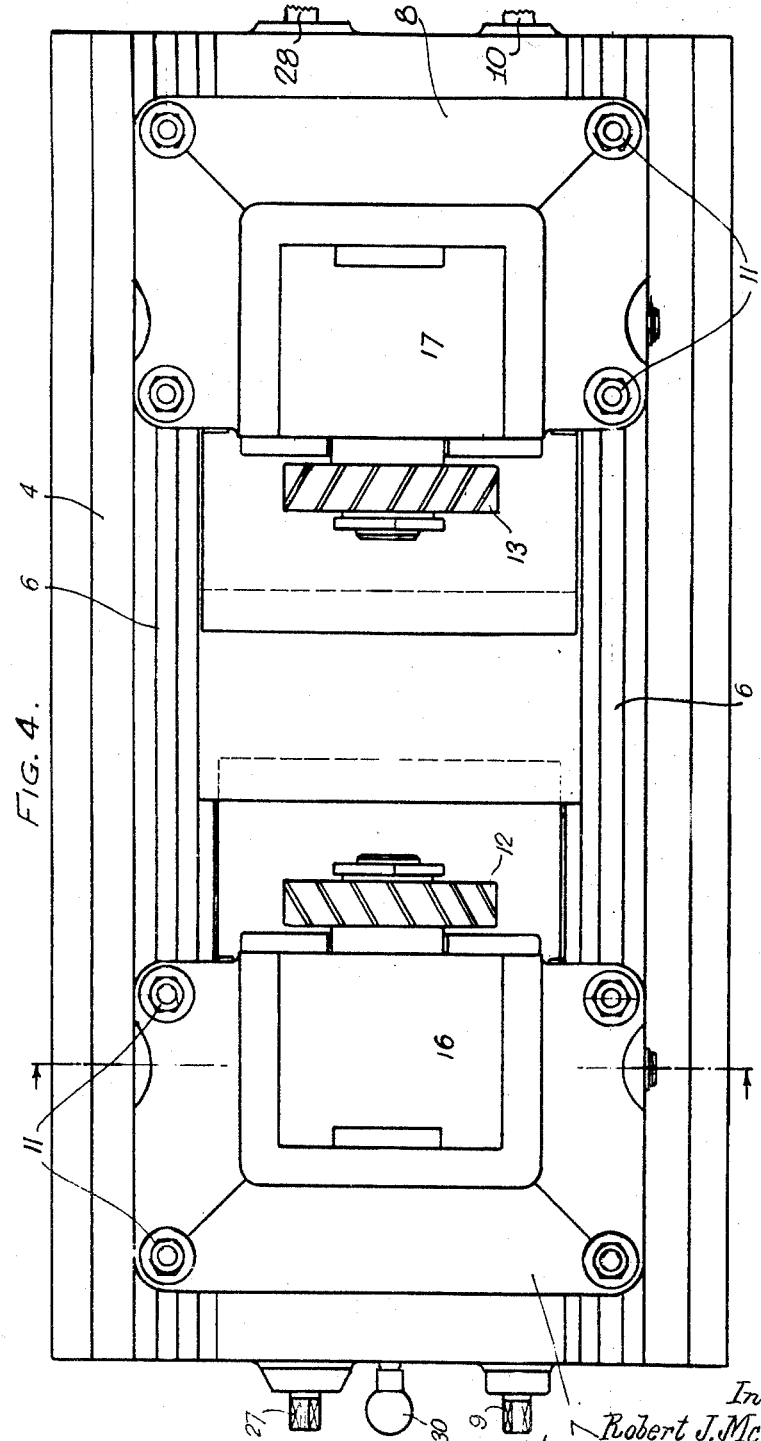

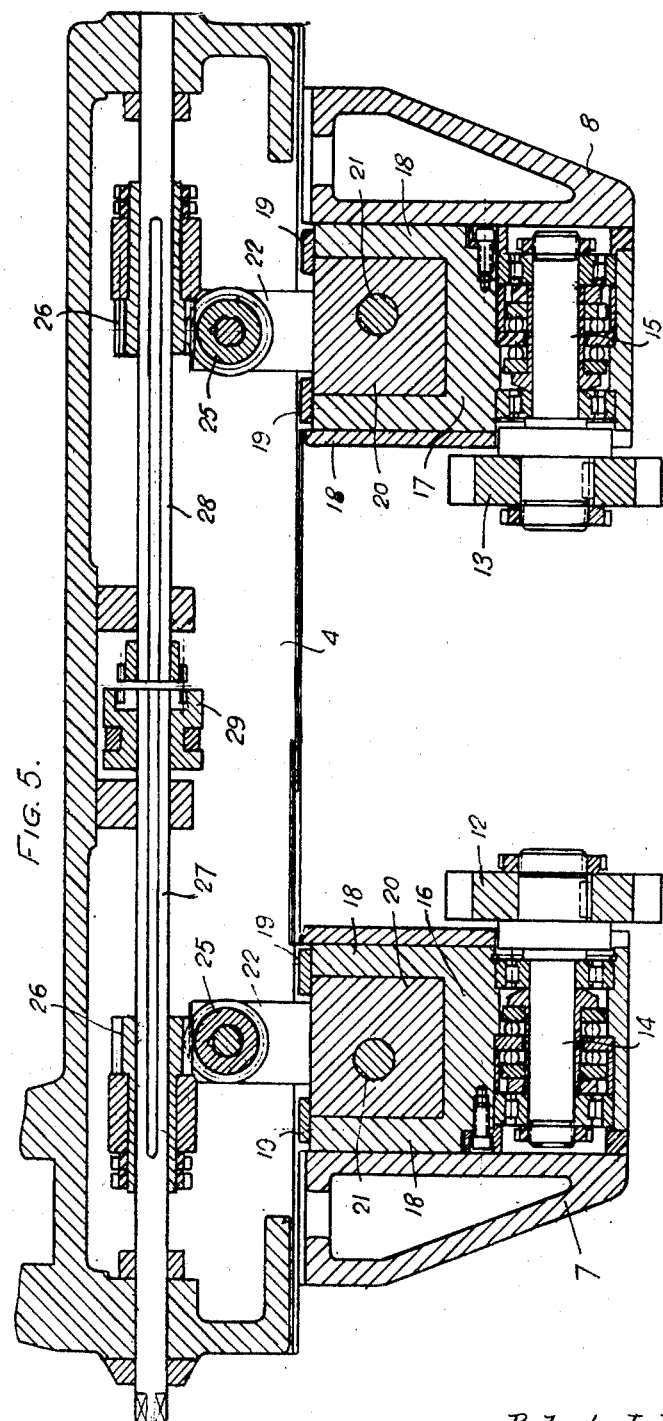

June 5, 1951 — R. J. McLEOD — 2,556,142
MACHINE FOR PRODUCTION OF GEAR TEETH
Filed March 6, 1945 — 5 Sheets-Sheet 5

Inventor
Robert J. McLeod
by Wilkinson & Mawhinney
Attorneys

Patented June 5, 1951

2,556,142

UNITED STATES PATENT OFFICE 2,556,142

MACHINE FOR PRODUCTION OF GEAR TEETH

Robert James McLeod, London, England; Barclays Bank Limited, London, England, executor of said Robert James McLeod, deceased Application March 6, 1945, Serial No. 581,293
In Great Britain November 7, 1944

3 Claims. (Cl. 90—1.6)

The present invention relates to the shaving of gear teeth so as to impart a finer finish than that obtained by gear cutting, and to provide a means of correcting errors in tooth profile, pitch and in the case of helical gears, helical angle.

Hitherto it has been customary to perform the operation of finishing gear teeth by shaving with the shaving cutter axis offset 10° to 20° from the axis of the work so as to ensure during rotation a cutting action at the pitch line.

According to the present invention there is provided a machine in which pinion form cutters are reciprocated across the width of the face of the work in a continuous to and fro motion whilst the work, that is the gear wheel, is slowly revolved and imparts a rotary motion to the cutter. In the case of small gears it may be convenient to reverse the procedure and allow the cutter to rotate the work when the work and not the cutter must be free running.

The cutter is in the form of a pinion having teeth of the correct shape and pitch and also the same helical angle as the work, with serrations to form a series of shaving teeth running across the teeth from tip to root and mounted on a freely running spindle.

The cutter axis will aways be parallel to that of the work and the action is a pure generatory one. This will be understood if the cutters are likened to files of the correct involute form and pitch mechanically operated so as to produce a fine finish on the faces of the gear teeth.

The cutters may be of any convenient width to suit the work, and so long as the reciprocatory stroke is arranged so that the whole cutter is not disengaged from the work at the end of the stroke the action is a continuous one of fairly rapid axial motion combined with a slow rotary motion.

It has been found that by shaving gears by this method the wavelength of any undulations on helical or spiral gears is of no importance, and slight errors in pitch or helical angle are corrected; moreover, it is not necessary for the width of the cutter to have any relation to the wavelength of undulations.

The accompanying drawings illustrate a machine designed for double helical gears in which two cutters are simultaneously employed on their respective helices. The invention is not limited to the particular construction illustrated as obviously the machine may be disposed about a vertical axis or may be provided with a single cutter.

In these drawings:

Fig. 2 is a plan view showing the work in position and the cutters projecting slightly beyond the edge of the work gear teeth, but not disengaged, thus illustrating the limiting position of the stroke which is similarly limited at the opposite side edge.

Fig. 4 shows the cutter slide in elevation with the two cutter heads mounted thereon.

Fig. 5 is a sectional plan of the cutter slide and cutter heads.

In the following description like numerals designate like parts throughout.

Figure 1:
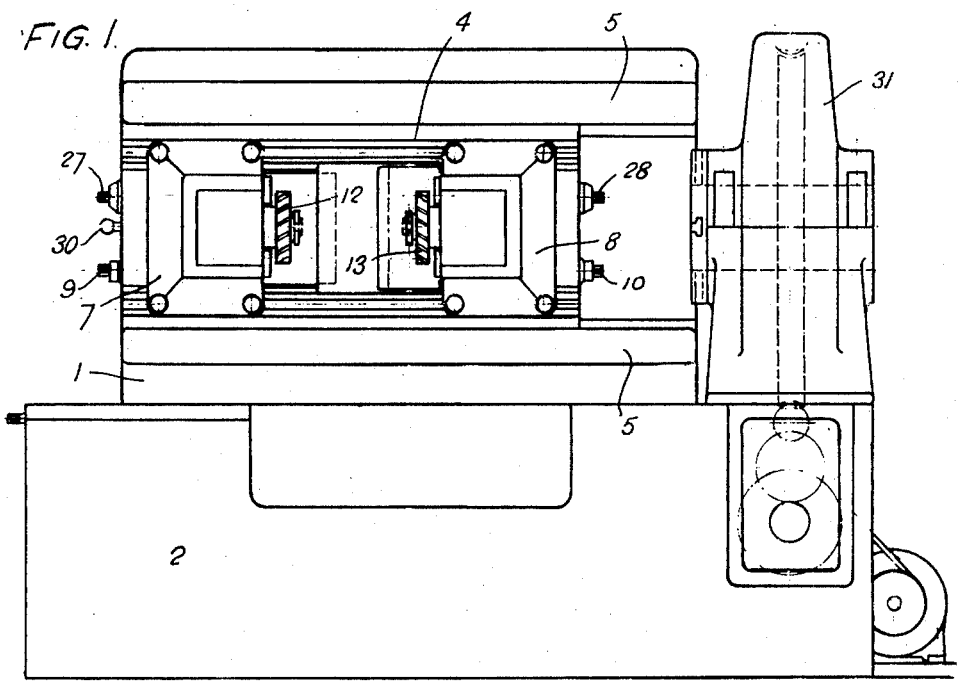
Fig. 1 is a front elevation showing the disposition of the cutters and work driving head.
Figure 3:
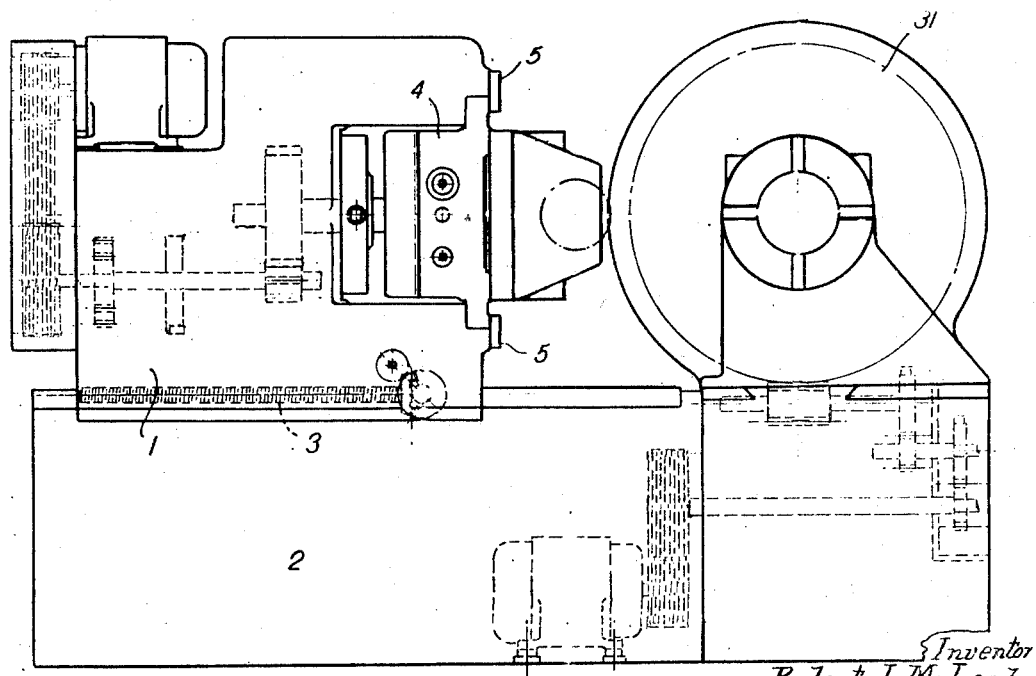
Fig. 3 is a side elevation showing the drive from the motor to the cutter slide and the independent drive to the work. The two drives are shown independent of one another; whilst this is convenient, particularly in large machines, a common drive may be used.

Referring to Figs. 1, 2 and 3, 1 is the main saddle which is slideably mounted on a base 2 and controlled by a screw 3, Fig. 3.

The cutter slide 4 is mounted in suitable slideways at the front of the main saddle, having keep plates 5 fitted. At the back of the slide 4 is provided a vertical slideway in which is fitted a sliding block which together with a crank disc and adjustable crank pin forms a crank mechanism which is adjustable for length of stroke.

This crank mechanism is operated by motor and gearing shown in dotted lines in Figs. 2 and 3 and includes pick off gears for speed variation.

Figure 6:
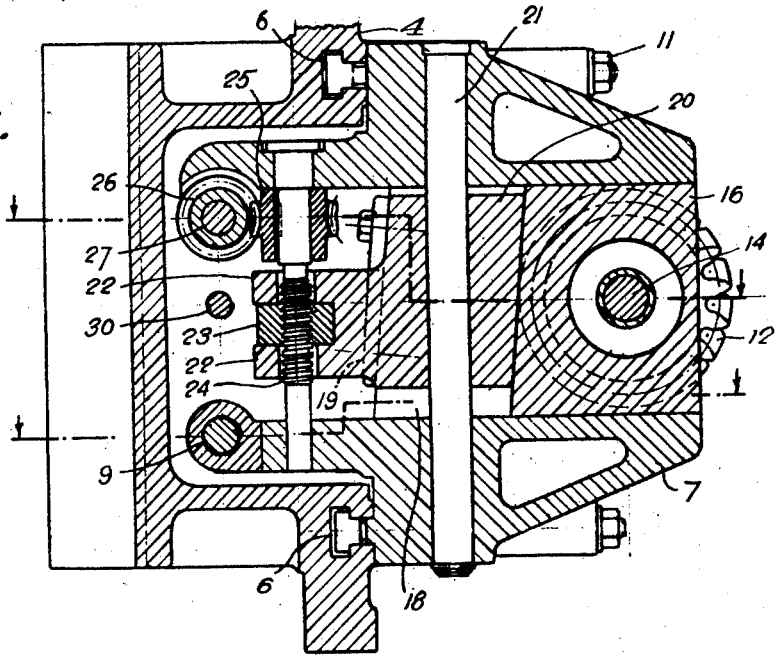
Fig. 6 is a sectional elevation of one cutter head.
Figure 7:
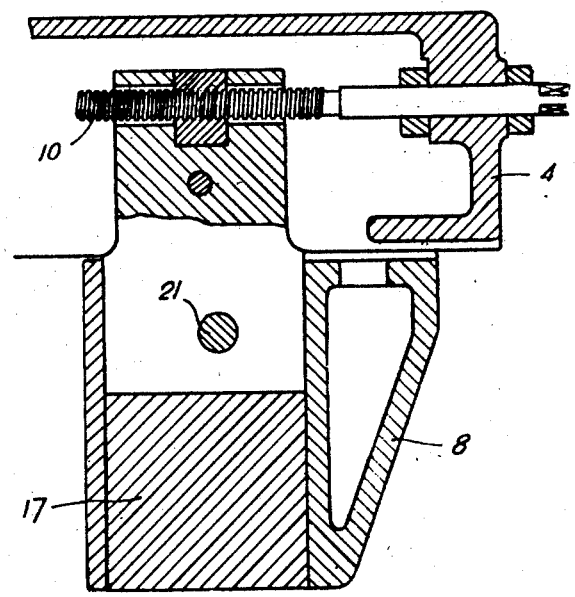
Fig. 7 shows the method of adjusting the position of the cutter head on its slide to suit the work.

On the front of slide 4 are machined T slots 6, Fig. 6, into which cutter heads 7 and 8 are adjustably fitted; these cutter heads may be moved by screws 9 and 10 respectively to any desired position to suit the face of the gear wheel it is proposed to have (see Fig. 2). After adjusting the cutter heads to their respective positions by means of screws 9 and 10 they are locked by means of T bolts 11, Figs. 4 and 6 to slide 4.

Referring particularly to Figs. 5 and 6 the cutter heads are shown in section together with the means adopted of adjusting the depth of cut of each cutter either independently or in unison.

Cutters 12 and 13 are each keyed to their respective free running spindles 14 and 15, which spindles are shown in Fig. 5 with roller journal bearings and double thrust ball bearings. They could equally have plain journal bearings and thrust collars or a combination of ball thrust and plain journal bearings.

In the actual shaving of gears, particularly large gears, it will not be convenient to apply depths of cuts which must be measured in thousandths of an inch by moving the whole cutter saddle 1. Therefore I provide a means of applying depth of cut whereby the movement can be controlled to 0.0001 inch as follows:

Each cutter head has an outer shell into which are slideably fitted cutter blocks 16 and 17, and as the cutter blocks are identical they can be described by reference to Figs. 5 and 6.

In these figures it will be seen that the cutter blocks are slotted out with their inner surface inclined to suit the inclined block 20 with their projecting sides also inclined to the same angle. To the projecting sides 18 are fitted keep plates 19, thus containing the inclined blocks.

To ensure a straight line motion of these inclined blocks 20, vertical pins 21—Fig. 6—are fitted.

These vertical pins are a driving fit in the top and bottom positions of the cutter block shell and a sliding fit in the inclined block, so that any upward or downward motion of the sliding block will move the cutter block inwards or outwards. To control the amount of this motion the inclined block 20 has projecting horns 22 which contain a nut 23; engaging this nut is a screw 24 which is turned as desired by a worm wheel 25 operated by a worm 26. To enable one or both cutters to be moved in or out, two splined or keyed rods are provided and joined together by a clutch 29, one half of which is rigidly keyed to a rod 28 and the other half slideably fitted to a rod 27. An operating rod 30 with ball handle is shown in Fig. 4.

By so arranging the above gearing and screws that one turn of the rods 27 and 28 will move the cutters 0.001 inch, if there are ten teeth in the clutch 29 there is obtained an adjustment of one cutter relatively to the other of 0.0001 inch; similarly when moving the cutters in unison any fraction of a turn of rods 27 and 28 will give a proportionate fraction of 0.001 inch movement of the cutters.

The work is mounted preferably in bearings Figs. 2 and 3 and rotated by a coupling or chuck attached to driving head 31. The driving head is shown driven by a separate motor and gearing with pick off gears to vary the speed and need not be particularly described.

I claim:

1. A machine for finishing the teeth of gear wheels by shaving in which machine pinion-form cutters are axially reciprocated, and are rotated synchronously by and with the work, the cutters being mounted on independent free-running co-axial spindles, and rotating in planes parallel to the transverse plane of the work, cutter heads for the cutters mounted co-axially on a cutter slide, means being provided for feeding the cutters into the work to produce the desired depth of cut, the feed being in small increments, each cutter head having an outer shell in which a cutter block is fitted, and each block being formed with an inclined surface to conform to an inclined block, whereby any upward or downward movement of such inclined block will cause an inward or outward movement of the cutter block, such movement being controlled by a screw actuated by a worm and worm wheel.

2. A machine according to claim 1 in which means are provided for displacing the inclined blocks either independently or in unison.

3. A machine for finishing the teeth of gear wheels by shaving in which machine pinion-form cutters are axially reciprocated, and are rotated synchronously by and with the work, the cutters being mounted on independent free-running co-axial spindles, and rotating in planes parallel to the transverse plane of the work, said cutters being movable by means of rods journaled transversely in the machine and connected together by a toothed clutch therebetween, said arrangement being such that the rods can cause the cutters to move in unison or relatively to one another.

ROBERT JAMES McLEOD.

REFERENCES CITED

The following references are of record in the file of this patent:

UNITED STATES PATENTS

| Number | Name | Date |
|---|---|---|
| 1,175,066 | Lees | Mar. 14, 1916 |
| 1,642,179 | Schurr | Sept. 13, 1927 |
| 1,697,823 | Schurr | Jan. 1, 1929 |
| 1,948,071 | Hofmann et al. | Feb. 20, 1934 |
| 1,990,239 | Miller | Feb. 5, 1935 |
| 1,996,380 | Kitchen | Apr. 2, 1935 |
| 2,055,132 | McLeod | Sept. 22, 1936 |
| 2,123,717 | Dalzen | July 12, 1938 |
| 2,126,178 | Drummond | Aug. 9, 1938 |
| 2,207,438 | Miller | July 9, 1940 |
| 2,236,256 | Allard | Mar. 25, 1941 |
| 2,267,692 | Dalzen | Dec. 23, 1941 |
| 2,338,528 | Miller | Jan. 4, 1944 |
| 2,380,224 | Drummond | July 10, 1945 |